United States Patent [19]

Allyson et al.

[11] Patent Number: 5,144,140

[45] Date of Patent: Sep. 1, 1992

[54] DETECTION OF EXPLOSIVES

[75] Inventors: Julian D. Allyson, Glasgow; Ramon Spackman; Gwilyn D. James, both of Oxfordshire, all of United Kingdom

[73] Assignee: Cogent Limited, United Kingdom

[21] Appl. No.: 711,113

[22] Filed: Jun. 4, 1991

Related U.S. Application Data

[63] Continuation of Ser. No. 564,161, Aug. 7, 1990, abandoned.

[30] Foreign Application Priority Data

Aug. 14, 1989 [GB] United Kingdom ................ 8918484

[51] Int. Cl.⁵ ........................................ G01N 23/222
[52] U.S. Cl. ............................ 250/358.1; 250/359.1; 250/390.04; 376/159
[58] Field of Search ............... 250/358.1, 359.1, 360.1, 250/366, 367, 390.02, 390.04, 390.07; 376/157, 158, 159

[56] References Cited

U.S. PATENT DOCUMENTS

| | | | |
|---|---|---|---|
| 3,255,352 | 6/1966 | Johnston | 250/303 |
| 3,308,296 | 3/1967 | Cowan et al. | 250/366 |
| 3,808,444 | 4/1974 | Schneeberger et al. | 250/366 |
| 3,832,545 | 8/1974 | Bartko | 376/159 |
| 3,997,787 | 12/1976 | Fearon et al. | 250/359.1 |
| 4,463,263 | 7/1984 | Padawer | 250/363.01 |
| 4,483,817 | 11/1984 | Evans et al. | 376/159 |
| 4,756,866 | 7/1988 | Alvarez | 376/157 |
| 4,851,687 | 7/1989 | Ettinger et al. | 250/390.04 |
| 4,879,735 | 11/1989 | Owens | 378/51 |
| 4,918,315 | 4/1990 | Gomberg et al. | 250/390.04 |

FOREIGN PATENT DOCUMENTS

| | | |
|---|---|---|
| 0295429 | 12/1988 | European Pat. Off. . |
| 0297249 | 1/1989 | European Pat. Off. . |
| 1392169 | 9/1972 | United Kingdom . |

*Primary Examiner*—Constantine Hannaher
*Assistant Examiner*—Edward J. Glick
*Attorney, Agent, or Firm*—Brumbaugh, Graves Donohue & Raymond

[57] ABSTRACT

An analyzer for detecting explosives has at least one source and a plurality of gamma ray detectors. An article to be analyzed is moved adjacent the source and detectors and is subjected to neutrons which generate gamma rays in any nitrogen in the article. The gamma rays are detected and analyzed to determine the nitrogen concentration within the article. In order to achieve an area of uniform detection there are a plurality of detectors equidistant both from each source and from the article to be analyzed. In order to avoid a decrease in sensitivity away from the sources and detectors, there may be a second opposing array of sources and detectors on the opposite side of the articles. For greatest uniformity of detection, a source in one array opposes a detector in the other array and vice versa. Transmission of radiation from the analyzer is kept at safe levels by enclosing the analyzer within shielding which includes shield members extending from a trolley or other transport mechanisms.

8 Claims, 4 Drawing Sheets

DETECTION OF EXPLOSIVES

This application is a continuation of application Ser. No. 07/564,161, filed on Aug. 7, 1990, now abandoned.

BACKGROUND OF THE INVENTION

1. Field of the Invention

The present invention relates to an analyser for detecting explosives. It is particularly, but not exclusively, concerned with the detection of explosives in luggage in e.g. an airport security system.

2. Summary of the Prior Art

It is known that explosives generally contain a higher amount of nitrogen than normal objects to be found in luggage, and therefore consideration has been given to methods for analysing the amount of nitrogen present in luggage to detect the presence of explosive. When nitrogen is subject to neutrons, it emits gamma-rays at predetermined frequencies, by detection of such gamma-rays, it is possible to determine the nitrogen concentration of a particular sample. Thus, if it is found that there is an excessive level of nitrogen in any particular part of an item of luggage, that item becomes suspect, and therefore should be subject to further investigation.

One proposal for investigating explosives by mean of neutron analysis is disclosed in GB 1392169. In this document, an item of luggage is positioned with an enclosure, the walls of which contain gamma-ray detectors. At one point in the walls, there is a neutron source which, subjects the item of luggage within the enclosure to neutrons, and the gamma-rays generated are then detected by the gamma-ray detectors. Since the source and the detectors which detect gamma rays due to the neutrons from that source are on the same side of the item of luggage, this configuration is known as scatter geometry. In GB 1392169 the gamma-ray detectors are axially elongate, so that their maximum detection efficiency is axial, so they may be considered as detecting gamma-rays from only a limited area of the item of luggage.

In our UK patent number 2217009, we described a system for detecting explosives in which each item of luggage is passed adjacent a plurality of detectors, arranged approximate one or more neutrons sources. The output of the detectors were then analysed over a series of time intervals, so that each time interval corresponded to the movement of only part of the luggage that passed the detectors. This was found to give good detection efficiency.

One problem with any system which uses the presence of nitrogen in explosive for detection is that the standard items in luggage, such as clothing, may have nitrogen contents which are not significantly less than the nitrogen content of the explosive. Some types of explosive have high nitrogen contents, and these are relatively easy to detect. Other types of explosive, however, may have a lower nitrogen content (e.g. 18%) and it is difficult to detect the difference between this and e.g. wool which has a nitrogen content of around 13%.

SUMMARY OF THE INVENTION

It has now been found, however, that when operating in scatter geometry there is an optimum detector/source distance which gives a substantially uniform detection response in the source/detector direction within the article. This uniform response region makes it possible to detect the presence of explosives in luggage to a sufficiently high level of sensitivity.

A plurality of detectors may be provided, sharing a common source. The detectors have substantially the same spacing from the source.

Suitable electronic circuitry is provided for processing the signals from the detectors to detect if the gamma-rays detected represent the presence of explosive in the luggage.

In order to achieve the desired level of symmetry, each detector lies on the circumference of the base of an imaginary right circular cone in space having its apex at a target point in the piece of luggage to be analysed, and its axis passing through the source. Furthermore, the detectors should be spaced around the circumference of the base of that cone, so that one of the detectors lies on the opposite side of the source from another, achieved by having two of the detectors on an imaginary straight line intersecting the axis of the cone.

In one arrangement, four detectors are provided, with two of the detectors lying on a first imaginary straight line intersecting the axis of the cone, and the other two detectors lying on a second imaginary straight line, again intersecting the axis. Alternatively, at least one other neutron source may be provided. Then at least two of the detectors associated with the first source should then lie on the circumference of a base of a second imaginary right circular cone in space which has its axis at another target point in the piece of luggage to be analysed and its axis passing through that second source. Indeed, a third source may be provided lying on the axis of a third right circular cone with two detectors lying on the base of that cone, and in a further development this process may be repeated to form an array of sources and detectors. However, since one of the more expensive components of the system is the source (s), there is a balance between increasing the number of sources and detectors for sensitivity and the consequent increase in cost, and typically three sources and three detectors may be used.

The array then forms a tessellation of sources and detectors with each detector forming a source/detector pair with more than one source. This arrangement can provide a more uniform response over a larger area. This is desirable because it prevents clothing of lower nitrogen content viewed in a region of high response from being analysed as an explosive of high nitrogen content in a region of low response.

The arrangements discussed above decrease in nitrogen sensitivity away from the plane of the sources and detectors. There is therefore advantage in providing further detectors and source(s) in a position opposed to the original plane of sources and detectors, so that the item of luggage, or other article is placed between the plane of the detectors and source(s) and the further detectors and source(s). In the case where a tessellation of three sources and three detectors are provided on one side of the item of luggage, or other article, a similar tessellation may be provided on the other side, with a source in one tessellation being directly opposed to a detector in the other tessellation, and vice versa.

In practice, the system will be sensitive to gamma rays from an area around the axis of the imaginary cones discussed above, and in practice, this area can be made to correspond generally to size of a large suitcase. It has been found that the optimum source/detector distance is of the order of 300 mm, to give a corresponding substantially uniform detection area, and thus a three source/three detector tessellation discussed above may provide a substantially uniform detection area of 900 mm by 600 mm.

By suitable design of the system, the luggage analyser can be made sufficiently compact to be transportable.

BRIEF DESCRIPTION OF THE DRAWINGS

Embodiments of the invention will now be described in detail, by way of example, with reference to the accompanying drawings in which.

DETAILED DESCRIPTION

Figure 1:
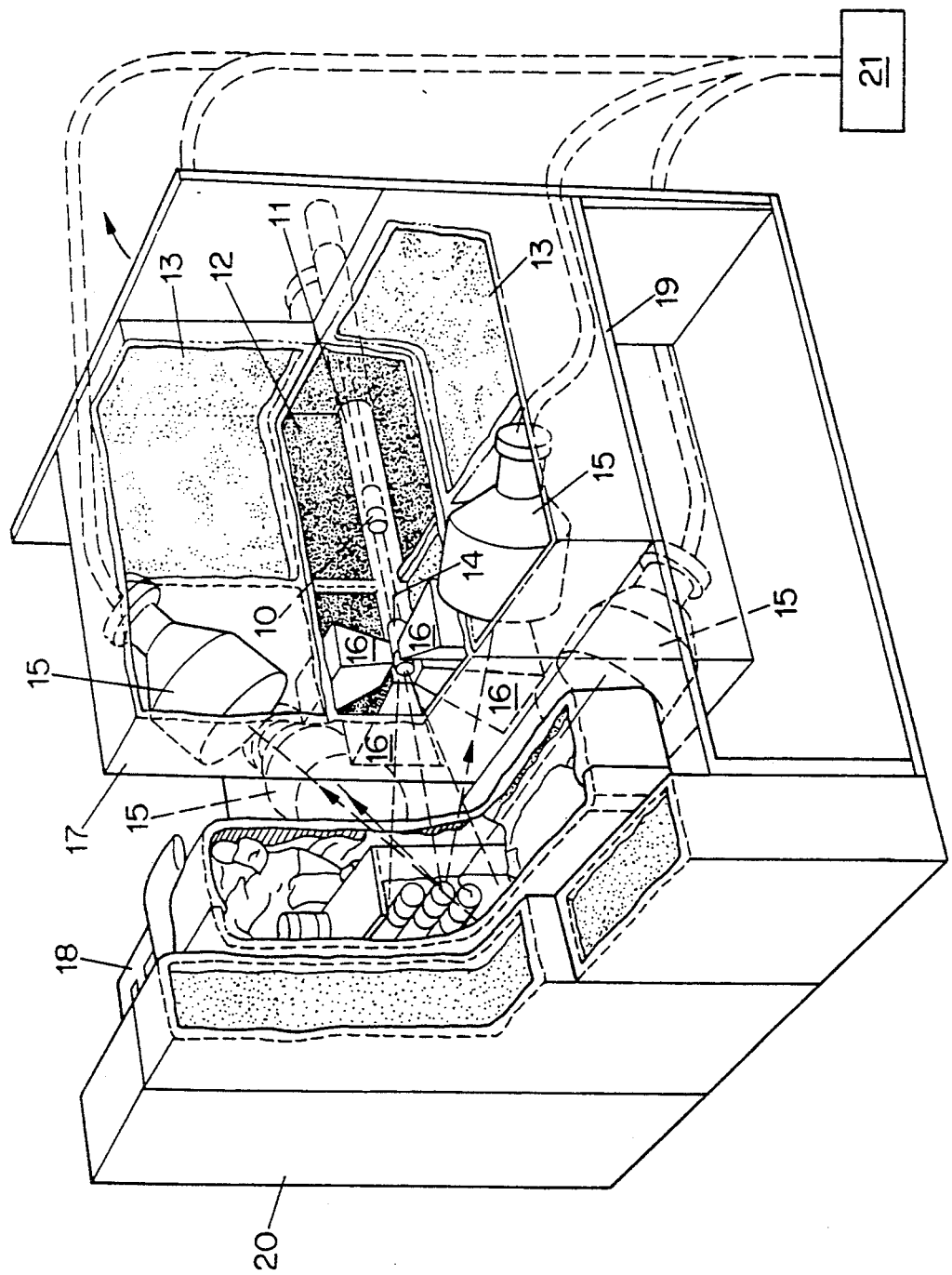
FIG. 1 shows a general perspective (partially in section) of a luggage analyser being a first embodiment of the present invention.

As illustrated in FIG. 1, a luggage analsyer according to the present invention has neutron source 10 contained in a tube 11 and preferably movable therein. The source is e.g. a Cf-252 source, the neutrons for which interact with nitrogen nuclei to produce 10.8 MeV gamma-rays. In the withdrawn position of the source 10, the source is surrounded by shielding 12 and 13 of e.g. polythene and slow neutron absorbing material borated resin, and this represents the non-operating position for the analyser.

When the analyser is to be used, the source is moved forward to a second position 14, at which it lies at the center of an array of four detectors 15. This movement is achieved by e.g. a pneumatic piston (not shown) supplied with pressurised air. The piston carries a rod terminating in a ball which fits into a socket in a short plastics cylinder. At the end of that cylinder remote from the rod is a cylindrical hole which holds a plastics capsule containing the source. The distance of movement is e.g. 300 mm. In that second position 14, the source is substantially uniformly spaced from the detectors, by a spacing of e.g. 300 mm.

The detectors 15 may be 76.2 to 101.6 mm × 76.2 to 101.6 mm NaI (Tl) scintillator detectors with their axes at 45° to the axis of the source.

To prevent direct passage of gamma rays from the source in its forward position 14 to the detectors 15, four gamma-ray shields 16 of e.g. lead are provided in between the source and the respective detectors 15.

FIG. 1 also shows the modular construction of the sources and detectors, hence the detectors 15 each provided in a box placed around a central box housing the source in its tube 11. It can be seen that one surface of those boxes forms a working surface 17 against which is placed an article of luggage 18 which is to be analysed. A suitable supporting surface 19 is provided for the luggage 18, and shielding 20 is provided on the opposite side of the luggage 18 from the source.

In this position the source is about 112 mm from the working surface 17, and hence from the wall of the luggage 18, and the distance from that point to the detector is 280 mm.

FIG. 1 also illustrates schematically the connections of the detectors 15 to suitable circuitry 21 which analyses the outputs of the detectors.

That detector circuitry 21 analyses the pulse from the detectors 15 and looks for pulses (corresponding to gamma-ray detection events) in a suitable range which includes the 10.8 MeV gamma rays corresponding to interactions with nitrogen nuclei, e.g. 9.5 MeV In use, the source is first positioned in its withdrawn position 10 and a piece of luggage 18 is placed as symmetrically as possible against the working surface 17. The source is then moved to its forward position 14. In this position (and indeed in the withdrawal position assuming the tube 11 is straight) the source lies on the axis of a imaginary right circular cone in space, whose apex is in the luggage 18, and the detectors 15 lie on the circumference of the base of that cone. Furthermore, opposite pairs of detectors lie on an imaginary straight line intersecting the axis, that intersection preferably being the point where the source is in its forward position 14.

In that forward position, and with the item of luggage 18 suitably positioned, the outputs of the detectors 15 is investigated by the analysing means 21. Preferably, the source is then moved to its withdrawn position 10, the luggage 18 is turned around, so that the opposite surface is positioned against the working surface 17, and the process repeated. In this way, the problem of the thickness of the luggage 18 can be minimized.

Figure 2:
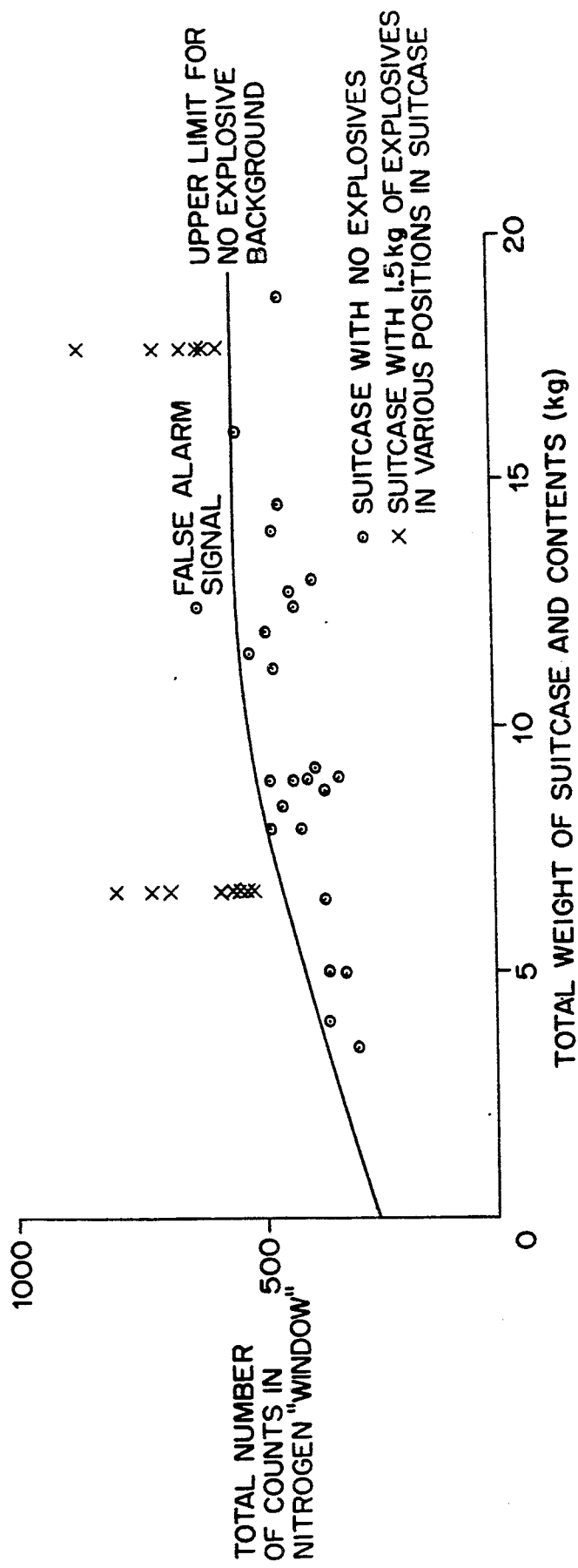
FIG. 2 shows a graph of experimental results carried out using the analyser of FIG. 1.

FIG. 2 shows the experimental results achieved by the apparatus of FIG. 1 when tested on a variety of suitcases. The circles indicate experimental measurements on suitcases with no explosive, while the crosses show experimental measurements on a suitcase of 6.5 kg and another of 17.5 kg, each containing 1.5 kg urea (whose behaviour when bombarded with neutrons is similar to explosive). It can be seen that (with the exception of one false alarm signal) there was an upper limit for analysis of suitcases which did not contain explosive, and all those suitcases containing explosive produced results above that limit. Thus, it is possible to detect whether or not an item of luggage has explosive in it.

Figure 3:
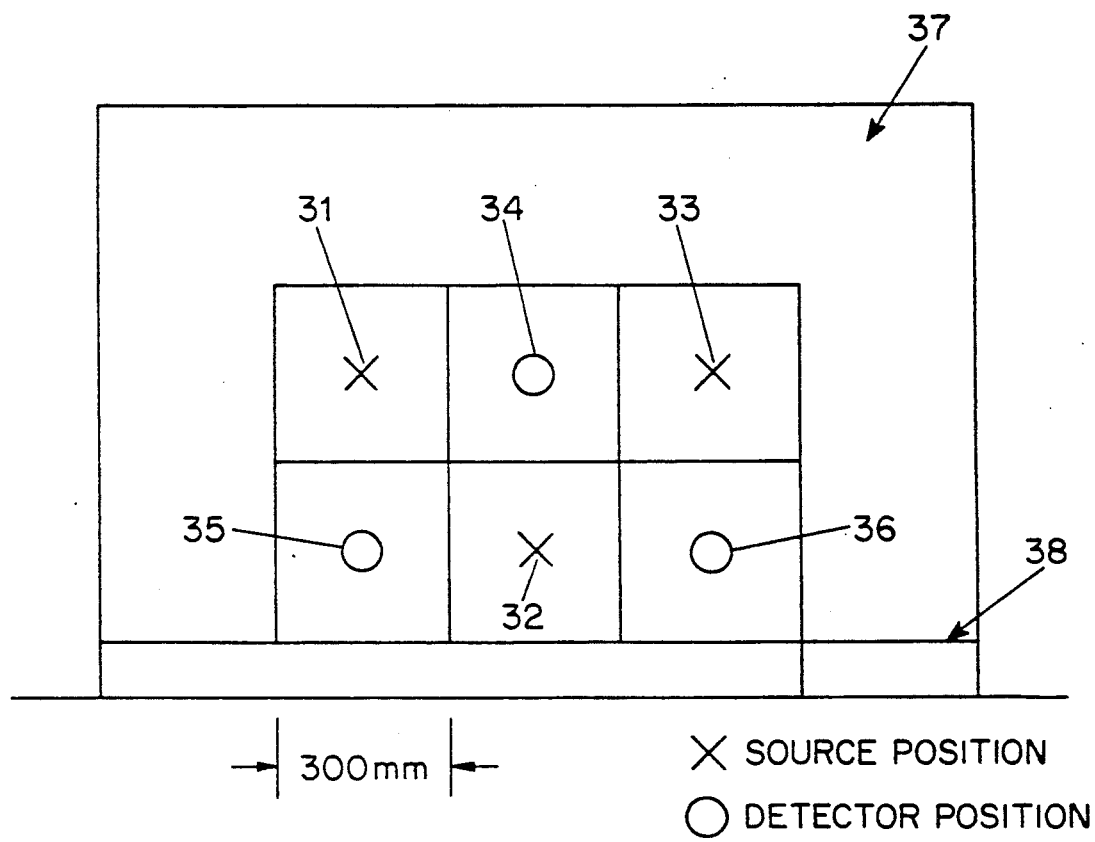
FIG. 3 shows a schematic view of a source/detector arrangement for use in a second embodiment of the present invention.

As was mentioned previously, the detection efficiency is particularly sensitive to the symmetry of the arrangement of the source and detectors, and FIG. 3 shows an alternative arrangement which is thought to give more uniform sensitivity. In this arrangement, three sources 31, 32, 33 are provided, as are three detectors 34, 35 and 36, in an array. The array is surrounded by suitable shielding 37 of e.g. boron loaded polythene, and this array can then replace the detector and sources 15 in FIG. 1, with a surface 38 corresponding to the supporting surface 19 for the luggage 18.

As illustrated, the array of sources and detectors is formed by a series of cubes, each containing a source or a detector, and each having a width or height of 300 mm. The detectors may be similar to the detectors 15 in FIG. 1, but preferably they should have a 152.4 mm diameter and be 50.8 mm thick, rather than being 76.2 × 76.2 mm. This increases the surface area through which gamma rays can enter the detector. The detectors will be aligned substantially normally to the source/detector plane.

Considering first the source 32, this can be assumed to lie on the axis of an imaginery right circular cone whose apex lies in the item of luggage to be analysed. In this case, the detectors 34, 35, 36 lie on the circumference of the base of a right circular cone, in a similar way to three of the detectors in the first embodiment. Again, two detectors (detectors 35, and 36) lie on opposite sides of the source 32, so that there is a line joining those detectors 35, 36 which intersects the axis of the imaginary cone. Furthermore, however, if source 31 is considered to lie on the axis of a further right circular cone, then detectors 34 and 35 lie on the circumference of the base of that cone, and similarly the source 33 can be considered to lie on the axis of a cone with detectors 34 and 36 lying on the circumference of the base of that cone. In each case, the apex of the cone lies within the luggage to be analysed. It has been found that this arrangement provides a more uniform detection efficiency than that of FIG. 1. Indeed, the array of sources and detectors may be extended from that shown in FIG. 3, if this is desired.

In this arrangement, the sources are preferably about 100 mm from the working surface against which the luggage is to be positioned, and the shielding and arrangments for moving the sources 31, 32, 33 may be similar to those used in the embodiment of FIG. 1.

In a further development, a second array of sources and detectors, similar to that shown in FIG. 3, may be provided on the opposite side of the item of luggage from the first array. In this way the decrease of sensitivity with distance from the source/detector plane can be mitigated. For luggage, a suitable spacing between the planes of the two source/detector arrays is of the order of 350 mm. Preferably, where two such arrays are provided, a detector of one array is opposed to a source in the other array, and vice versa.

A second array of source and detectors may also be provided for the arrangement of FIG. 1.

Figure 4:
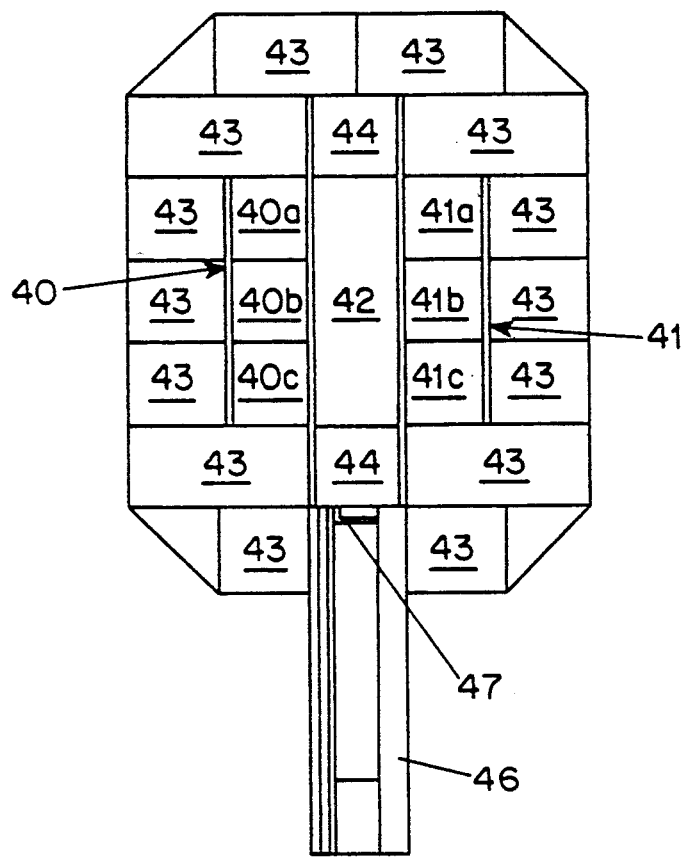
FIG. 4 shows a sectional plan view of a luggage analyser being another embodiment of the present invention.
Figure 6:
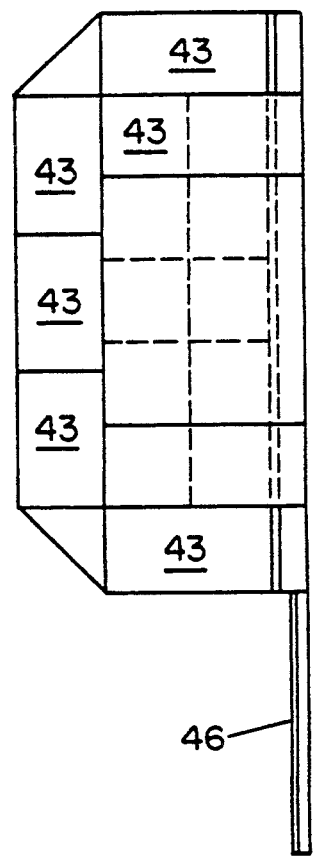
FIG. 6 shows a side view of the analyser of FIG. 4.
Figure 5:
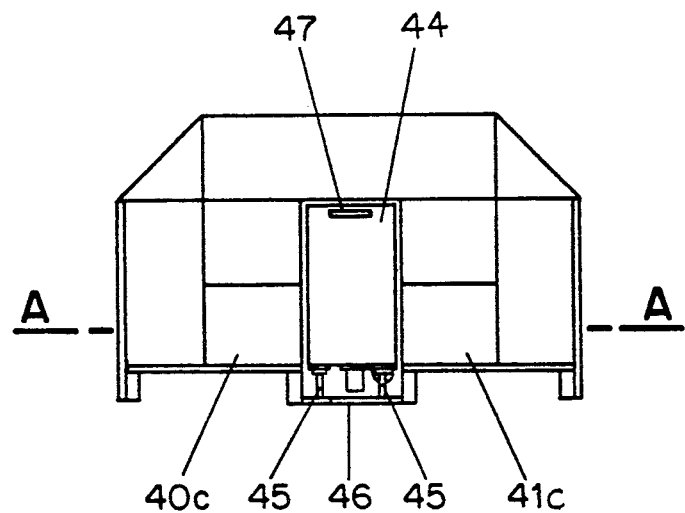
FIG. 5 shows an end view of the analyser of FIG. 4, the section of FIG. 4 being taken along the line A—A in FIG. 5.

Another embodiment of the present invention, in which two arrays of sources and detectors is provided is shown in FIGS. 4 to 6. Referring first to FIG. 4, the luggage analyser comprises first and second arrays of sources and detectors, 40, 41 arranged on either side of an article support means 42. Each of the arrays 40, 41 corresponds generally to the arrangement shown in FIG. 3, so that each array is divided into compartments 40a, 40b, 40c, 41a, 41b, 41c each containing a source or detector. Of course, FIG. 4 only shows one plane of such compartments, there being another plane of such compartments above the plane of the paper in FIG. 4. In the embodiment of FIG. 4, it is important that the detector of one array 40 is directly opposite a source in the other array 41. Thus, if compartment 40b corresponds to a source, compartment 41b will correspond to a detector, and compartments 41a and 41c will correspond to a source. Surrounding the arrays 40, 41 are blocks of shielding 43, and the article support means 42 also has blocks 44 of shielding thereon which blocks of shielding 44 are aligned with blocks of shielding 43 at the ends of the analyser, so that a central space is defined between the arrays 40, 41 which is wholly enclosed by shielding, which is of a suitable size to contain luggage. FIG. 6 also shows that the blocks of shielding 43 extend over the top of the article support means 42.

FIG. 5 shows that the article support means 42 has wheels 45 thereon, which wheels run on a track 46 extending from the analyser. A handle 47 on the article support means 42 allows the article support means to be moved on the track 46 to a withdrawn position, in which position an item of luggage can be placed thereon, between shielding blocks 44, and then the article support means 42 can be moved to the position shown in FIG. 4, in which position the item of luggage can be analysed. Thus, the article support means 42 forms a trolley.

The embodiments shown in FIGS. 4 to 6 is found to be particularly advantageous. The use of arrays 40, 41 on either side of the item of luggage means that the detection of explosive is not dependent on the location of the explosives within the item of luggage. A single array of detectors reduces in detection efficiency as the article is spaced therefrom, but with two opposing arrays 40, 41, a decrease in efficiency of one array results in an increase in efficiency of the other. Furthermore, it is found that the use of two arrays 40, 41 as described above provides a uniform measurement pattern over an area corresponding to normal luggage size. It has previously been difficult to provide uniform detection for a large item of luggage. Indeed, it had, at first, been thought that the arrangement where a detector of one array is directly opposite the source of another array could produce inaccurate results due to each detector being swamped by gamma rays passing between the arrays directly from the source, but this has proved not to be problem in practice.

The use of shielding blocks 43 ensure that satisfactory radiological protection can be achieved.

The present invention provides a relatively compact arrangement, and is therefore suitable for transportation. Additional shielding may be provided if desired.

Although the present invention has been described with reference to the detection of explosives in luggage, it is applicable to detection of explosives in other articles.

What is claimed is:

1. An apparatus for detecting the presence of explosives comprising:
   at least a first and a second neutron source;
   a plurality of gamma ray detectors for generating outputs in dependence on detected gamma rays;
   analysis means for generating signals corresponding to the output of each detector and for investigating those signals to detect whether explosive is present; and
   article support means for supporting an article to be analyzed such that a part of the supported article lies at a target point within the apparatus;
   wherein said plurality of gamma ray detectors each lie on the circumference of the base of an imaginary right circular cone in space having its apex at said target point, and the axes of said cone passing through said first neutron source, said plurality of gamma ray detectors being spaced around the circumference of the base of said cone with two of said plurality of gamma ray detectors being respectively on opposite sides of said first neutron source, and
   wherein at least two of said plurality of gamma ray detectors also lie on the base of a further imaginary right circular cone, said second neutron source being located on the axis of said further right circular cone, and the apex of said further right circular cone being spaced from the apex of said right circular cone by the same distance as the spacing of said first and second neutron sources.

2. An apparatus according to claim 1, wherein at least two of said plurality of gamma ray detectors also lie on the base of an additional right circular cone, there being an additional neutron source located on the axis of said additional right circular cone, and the apex of said additional right circular cone being spaced from the apex of said right circular cone by the same distance as the spacing of said additional neutron source from said first neutron source.

3. An apparatus according to claim 1, wherein said first and second sources and said plurality of gamma ray detectors form a first array on a side of said article support means, and there is a corresponding second array comprising a plurality of sources and detectors on the opposite side of said article support means.

4. An apparatus according to claim 3, wherein the axis of said right circular cone passing through said first source of said first array intersects one of said plurality of detectors of said second array, and the axis of a right circular cone passing through one of said plurality of sources of said second array intersects one of said plurality of gamma ray detectors of said first array.

5. An apparatus according to claim 1 which includes shield members disposed on the direct line between each neutron source and said plurality of gamma ray detectors.

6. An apparatus according to claim 1, wherein said article support means comprises a trolley, and said apparatus further comprises shielding surrounding said first and second sources and said plurality of gamma ray detectors, said trolley being movable into and out of said shielding.

7. A method for detecting whether explosive is present in an article comprising the steps of:
bringing an article adjacent at least a first and a second neutron source;
subjecting the article to neutrons;
detecting gamma rays emitted by the article by a plurality of gamma ray detectors which lie on the circumference of the base of a first imaginary right circular cone in space which cone has its apex at a target point which corresponds to a position into which said article is movable, and its axis passes through said first neutron source, said plurality of gamma ray detectors being spaced around the circumference of the base of said first cone and two of said plurality of gamma ray detectors being disposed on respective opposite sides of said first neutron source, and at least two of said plurality of gamma ray detectors lie on the circumference of the base of a second imaginary right circular cone in space the axis of which passes through said second neutron source and the apex of which is spaced from the apex of said first circular cone by the same distance as the spacing of said first and second neutrons sources;
generating signals corresponding to the output of each of said plurality of gamma ray detectors; and
analyzing said signals to detect whether explosive is present in said article.

8. A method for detecting whether explosive is present in an article comprising the steps of:
bringing an article between a pair of opposing arrays each comprising at least one neutron source and a plurality of detectors;
subjecting the article to neutrons;
detecting gamma rays emitted by the article by said plurality of detectors in each array, said detectors in each array lying on the circumference of the base of an imaginary right circular cone in space which cone has its apex at a target point which corresponds to a position into which an article is movable, and its axis passing through one of said at least one neutron source of the corresponding array, said plurality of detectors being spaced around the circumference of the base of said cone with two of said plurality of detectors being respectively on opposite sides of said at least one neutron source;
generating signals corresponding to the output of each of said plurality of detectors; and
analyzing said signals to detect whether explosive is present in said article.

* * * * *

UNITED STATES PATENT AND TRADEMARK OFFICE
CERTIFICATE OF CORRECTION

PATENT NO. : 5,144,140
DATED : September 1, 1992
INVENTOR(S) : Allyson et al.

It is certified that error appears in the above-identified patent and that said Letters Patent is hereby corrected as shown below:

Title page, Item 56, add the following to the list of "FOREIGN PATENT DOCUMENTS":

--2217009  10/1989  United Kingdom--;

Column 4, line 10, "9.5 MeV" should read --9.5 MeV to 11.3 MeV--.

Signed and Sealed this

Twenty-eighth Day of December, 1993

Attest:

BRUCE LEHMAN

Attesting Officer

Commissioner of Patents and Trademarks